2,764,471

RECOVERY OF URANIUM FROM DILUTE SOLUTIONS BY A PRECIPITATION METHOD

Glenn W. Kinzer, Columbus, and Richard D. Morin, Grandview Heights, Ohio, assignors to the United States of America as represented by the United States Atomic Energy Commission No Drawing. Application June 24, 1953, Serial No. 370,501

2 Claims. (Cl. 23—14.5)

The present invention relates to a method for the recovery of uranium from aqueous solutions and more particularly relates to a method for the selective separation of uranium from aqueous solutions wherein the uranium concentration is relatively low by comparison with extraneous metal values ordinarily associated therewith in solutions such as those formed by leaching naturally occurring low grade ore materials.

The present invention is also useful in the selective recovery and separation of uranium values from aqueous solutions derived from neutron-irradiated materials. However, the instant process is particularly well adapted to the selective recovery and separation of uranium metal values from extraneous materials which occur in the by-product solutions resulting from processing of phosphate rock and other low grade uranium-bearing materials, such as oil shales which contain uranium in amounts substantially less (ca. 0.005 to 0.009% by weight) than the other naturally occurring uranium ore materials such as carnotite and pitchblende, which heretofore have been the principal sources of uranium. For example, the superphosphate (monocalcium phosphate) leach solutions obtained in the course of processing phosphate rock for fertilizer have the following average composition:

| Constituent: | Grams per liter of solution |
|---|---|
| Uranium | 0.0115 |
| CaO | 17.5 |
| $P_2O_5$ | 56.8 |
| F | 0.15 |
| $SO_4$ | 2.70 |
| $Fe_2O_3$ | 0.085 |
| $Al_2O_3$ | 0.075 |
| $SiO_2$ | 0.0175 |
| $CO_2$ | 0.182 |

Sulfuric acid leach solutions from raw or roasted shale contain substantial amounts of iron, calcium, magnesium, potassium and sulfate ions besides lower concentrations of molybdenum, uranium, vanadium, and other ions.

It is an object of the instant invention to provide a method for the recovery of uranium from dilute aqueous solutions thereof and especially from acidic aqueous solutions containing large amounts of iron and aluminum in addition to uranium.

It is a further object of the present invention to provide a process whereby uranium can be selectively recovered and separated from aqueous leach solutions of uranium-bearing phosphates and shales.

Other objects and advantages of the instant invention will be apparent from the description which follows.

We have discovered a process for selectively precipitating uranium values from aqueous solutions and from aqueous solutions containing substantial quantities of numerous extraneous metal values such as those normally associated with uranium in naturally occurring ores, phosphate rocks and shale and/or neutron-irradiated mixtures. We have discovered that organic acids containing at least one nonmetal selected from the fifth group of the periodic table constitue suitable precipitants for uranium. The aryl phosphoacids have been found to be preferable for the precipitation of either the hexavalent uranium values as the uranyl ion or the lower valent uranous values from acidic aqueous solutions wherein the pH is between 0 and 3. Precipitation is preferably effected at room temperature, that is, about 25° C. (77° F.). The mole ratio of the organic acid precipitant to dissolved uranium content is suitably at least 5:1, and a 10:1 ratio is optimum. Increasing the mole ratio of precipitant to uranium to 20:1 does not substantially improve the quantity of uranium removed from solution by a 10:1 mole ratio. The organic precipitant for uranium is suitably introduced in the uranium-containing acidic aqueous solution either in the form of a saturated aqueous solution of the organic acid or a water-soluble alkali metal salt of said acid, and preferably as an aqueous alcoholic solution of either the acid or the salt. The treated aqueous solution can also be buffered to maintain the pH at least as acid as pH 3 or below.

The efficiency of the organic acids containing the aforementioned nonmetal values as precipitants for uranium values varies directly with the substitution of the organic acid molecule with aryl groups; this is particularly true in organic acids containing phosphorus. The arylphosphinic acids having the general formula $Ar_2PO_2H$, wherein Ar denotes an aryl group such as benzene or toluene, are preferred as precipitants for uranium over the corresponding phosphonic acids having the general formula $ArPO_3H_2$, wherein Ar denotes an aryl constituent. The monobasic bis-arylphosphinic acids, $R_2PO_2H$, such as bis-benzenephosphinic acid, $(C_6H_5)_2PO(OH)$, precipitate greater than 90% uranium from sulfuric acid solutions wherein the pH is between 0 and 2. Bis-p-toluene phosphinic acid precipitates between 86–97% uranium from sulfuric acid solutions; however, precipitation with either bis-benzene-phosphinic or bis-p-toluene phosphinc acid was reduced by 30–50% in the presence of iron and aluminum in the treated aqueous solution wherein the mole ratio of iron to aluminum is as much as 200 : 1. However, it is important that the iron values be present in the reduced state, that is, as ferrous ions, since the presence of ferric values during precipitation substantially reduces the yield of the precipitated uranyl compound. Reduction of iron values from the ferric to the ferrous state can be suitably effected by treating the aqueous solution with gaseous sulfur dioxide prior to introduction of the organic precipitant. Aluminum and iron values are the more troublesome interferants in most processes for recovery of uranium, while molybdenum and vanadium values also inhibit uranium recovery to some extent.

The accompanying examples will demonstrate that the phosphinic acids precipitate uranium either as the uranous ion or as the uranyl ion from sulfuric acid solutions and precipitation is operative even in the presence of interferants, such as molybdenum and vanadium.

The precipitate, when the precipitant is bis-benzenephosphinic acid, consists essentially of the compound uranyl bis-benzenephosphinate, $UO_2[(C_6H_5)_2PO_2]_2$, for which the calculated solubility product is $1.6 \times 10^{-15}$. This compound is thus substantially water-insoluble and readily separable from the aqueous solution in which it is formed. Both uranium values and the organic reagent employed as a precipitant therefor are readily recovered by the hydrolysis of said product so as to form the water-soluble alkali salt of the phosphinic acid and the substantially water-insoluble alkali diuranate. This latter compound is useful in the manufacture of glass. The uranyl bis-benzenephosphinate is readily converted by dilute (less than 1%) sodium hydroxide solution to the water-insoluble sodium diuranate and the water-soluble bis-benzenephosphinate in accordance with the equation following:

2UO₂[(C₆H₅)₂PO₂]₂ + 6NaOH →
    Na₂U₂O₇ + 4(C₆H₅)₂PO₂Na + 3H₂O

This reaction was checked by treating with dilute caustic soda samples of uranyl bis-benzenephosphinate precipitated from simulated leach solutions having pH's of 1 and 1.5. Uranium losses during regeneration tests were very small. The uranium content of the caustic wash averages less than 0.05 mg. of uranium per liter. It is apparent that loss of uranium during processing of the precipitate with caustic soda is slight. It is readily apparent that the instant method for precipitation of uranium as uranyl phosphinate and hydrolysis thereof to the alkali diuranate provides both a means for recovery of the precipitant for recycle and a means for effectively up-grading the uranium content of uranium-containing raw materials.

The following examples will further illustrate the process for precipitation of uranium from aqueous solutions using aryl-phosphoorganic acids.

EXAMPLE I

Test solutions which contained 20 mg. of uranium as uranyl ion in 350 ml. were prepared. The phosphorus-containing organic acid precipitant was added either as an alcoholic solution in the case of the free acid or as an aqueous solution in the case of the sodium salt of the acid. Final volume of the solution was 400 ml. Changes in pH of the solution were adjusted by adding dilute sulfuric acid. The mixture was stirred for 30 minutes and, if at this time a precipitate had formed, the solution was filtered and the uranium determined in the filtrate. The amount of precipitant used was ten times the theoretical for the uranyl ion present, assuming two of each of the phosphinate, phosphonate, or bis-arylphosphinate ions per uranyl ion. The results of the precipitation tests are shown in the following table.

TABLE I

*Precipitation of uranium from sulfuric acid solutions by phosphinic, phosphonic, and bis-arylphosphinic acids*

|  | Uranium Precipitated, Percent | | | |
|---|---|---|---|---|
|  | pH 0 | pH 1 | pH 2 | pH 3 |
| Phosphinic Acids, RPO₂H₂: | | | | |
| Benzene | 0 | 0 | 9 | 18 |
| Biphenyl | 93 | 97 | 91 | ------ |
| p-Toluene | 0 | 86 | 95 | 97 |
| Phosphonic Acids, RPO₃H₂: | | | | |
| p-Aminobenzene | 0 | 0 | 33 | 84 |
| Benzene | 0 | 0 | 0 | 59 |
| Benzyl | 5 | 10 | 25 | 47 |
| Cyclohexane | 0 | 0 | 40 | 86 |
| p-Chlorobenzene | 50 | 45 | 81 | 74 |
| n-Heptane | 0 | 0 | 0 | 0 |
| α-Phenyl-β-benzoylethyl | 0 | 7 | 50 | 43 |
| p-Toluene | 0 | 0 | 61 | 83 |
| Bis-arylphosphinic Acids, R₂PO₂H: | | | | |
| Bis-p-aminobenzene | 0 | 0 | 2 | 86 |
| Bis-benzene | 92 | 99 | 99 | 99 |
| Sodium bis-(phenylamino) | 0 | 0 | 10 | 10 |
| p-Toluene | 95 | 96 | 98 | 98 |

The following examples are concerned with the influence of extraneous ions on the precipitation of uranium at different acidities.

EXAMPLE II

Preliminary tests showed that aluminum and ferrous ions at mole ratios of 100:1 to 200:1 with respect to the uranium did not appreciably interfere with the precipitation of uranium by bis-benzenephosphinic acid in the pH range of 0 to 2. Ferric ion, however, reduced precipitation of uranium to 5 to 20% of the original. In order to obtain systematic data about the influence of extraneous ions during precipitation at different acidities with bis-benzenephosphinic acid, the following experiments were carried out with synthetic solutions. The initial test solutions contained 150 mg. of uranium per liter, and the ratio of precipitant added as an aqueous solution of sodium bis-benzenephosphinate to uranium was five times the stoichiometric quantity (mole ratio of 10:1). The results are tabulated in Table II.

TABLE II

*Precipitation of uranium from sulfuric acid solutions by bis-benzenephosphinic acid in the presence of extraneous ions*

| Extraneous Ion | Mole Ratio of Extraneous Ion to Uranium | Uranium Precipitated, Percent | |
|---|---|---|---|
|  |  | pH of Solution | |
|  |  | 1 | 1.5 |
| None added | ------ | 99 | 99 |
| Fe⁺² | 213:1 | 97 | 98 |
| SO₄⁻² | 213:1 | | |
| Fe⁺³ | 213:1 | 98 | 98 |
| SO₄⁻² | 872:1 | | |
| Al⁺³ | 440:1 | 99 | 99 |
| SO₄⁻² | 660:1 | | |
| Fe⁺² | 213:1 | | |
| Al⁺³ | 440:1 | 98 | 98 |
| SO₄⁻² | 872:1 | | |
| Mg⁺² | 115:1 | 99 | 98 |
| PO₄⁻³ | 77:1 | | |
| Mg⁺² | 115:1 | | |
| PO₄⁻³ | 77:1 | 99 | 98 |
| SO₄⁻² | 872:1 | | |
| SO₄⁻² | 872:1 | 99 | 99 |
| Na⁺¹ | 1744:1 | | |
| Fe⁺² | 213:1 | | |
| Mg⁺² | 115:1 | 99 | 99 |
| PO₄⁻³ | 77:1 | | |
| SO₄⁻² | 213:1 | | |
| Al⁺³ | 440:1 | | |
| Mg⁺² | 115:1 | 98 | 96 |
| PO₄⁻³ | 77:1 | | |
| SO₄⁻² | 660:1 | | |
| Fe⁺² | 213:1 | | |
| Al⁺³ | 440:1 | | |
| Mg⁺² | 115:1 | 96 | 82 |
| PO₄⁻³ | 77:1 | | |
| SO₄⁻² | 872:1 | | |

The per cent uranium removed was determined both by solution analysis after filtration and analysis of the precipitate. Good agreement in metal balance was obtained in most cases. Values reported in the table are based on solution analyses. Precipitation of uranium by bis-benzenephosphinic acid at pH levels of 1 and 1.5 was excellent in spite of the presence of various combinations of extraneous ions. As the complexity of the solution increased, a more acidic system appeared to favor precipitation of uranium.

The following example illustrates the three principal variables affecting the precipitation of uranium with a monobasic organic acid containing two aryl groups and phosphorus, specifically bis-benzenephosphinic acid.

EXAMPLE III

Simulated leach solutions containing 150 mg. of uranium (as uranyl ion), 7.5 grams of iron (as ferrous ion), 7.5 grams of aluminum, and 1.5 grams of phosphorus (as magnesium phosphate) per liter were prepared and adjusted to the desired pH with concentrated sulfuric acid. The precipitant was added as the water-soluble sodium salt dissolved in 25 ml. of water, and the mixture was then stirred for thirty minutes at the indicated temperature before filtration and subsequent washing of the precipitate. The results are shown in the following table.

TABLE III

| Mole Ratio of Precipitant to Uranium | Temperature during Precipitation | | pH of Solution | Uranium Precipitated, percent | Uranium Content of Cake, percent |
|---|---|---|---|---|---|
| | °F. | °C. | | | |
| 10:1 | 77 | 25 | 1.0 | 90 | 7.2 |
| 10:1 | 77 | 25 | 1.5 | 82 | 6.8 |
| 10:1 | 149 | 65 | 1.0 | 21 | 1.0 |
| 10:1 | 149 | 65 | 1.5 | 19 | 0.91 |
| 20:1 | 77 | 25 | 1.0 | 91 | 3.3 |
| 20:1 | 77 | 25 | 1.5 | 76 | 3.7 |
| 20:1 | 149 | 65 | 1.0 | 21 | 1.3 |
| 20:1 | 149 | 65 | 1.5 | 15 | 1.2 |
| 6:1 [1] | 77 | 25 | 1.5 | 97 | 16 |
| 10:1 [2] | 203 | 95 | 1.0 | 31 | 2.3 |

[1] A saturated aqueous solution of bis-benzenephosphinic acid containing 0.8 gram per liter was used.
[2] A hot saturated aqueous solution containing 3.22 grams per liter of precipitant was used.

A large-scale precipitation of uranium with 13,700 mg. of bis-benzenephosphinic acid from 10 liters of a simulated sulfuric shale leach solution containing 1,500 mg. of uranium is shown in Table IV. The subsequent processing of the precipitate formed thereby with dilute caustic soda for recovery of the organic reagent for recycle and the up-grading of the cake precipitate with respect to the uranium content thereof is shown in Table V.

TABLE IV

*Precipitation of uranium from simulated sulfuric acid leach solutions [1] by bis-benzenephosphinic acid. Caustic processing of precipitate.*
[13,700 mg. of precipitant used.]

| | mg. | Percent |
|---|---|---|
| Uranium precipitated (filtrate analysis) | 1,347 | 90 |
| Recovery of bis-benzenephosphinic acid by washing precipitate with dilute caustic soda | 13,400 | 97.5 |
| Weight of caustic-insoluble residue [2] from the washing of the precipitate | 3,104 | |

[1] Analysis of Original Solution (pH 1):

| Component | mg. |
|---|---|
| U | 1,500 |
| Al | 75,000 |
| Fe | 75,000 |

[2] Composition of Caustic-Insoluble Residue:

| Component | mg. | Percent |
|---|---|---|
| U | 1,260 | 40.6 |
| Al | 172 | 5.5 |
| Fe | 176 | 5.7 |

TABLE V

*Effects of caustic soda treatment on uranyl bis-benzenephosphinate precipitates obtained from simulated leach solutions*

| Mole Ratio of Bis-Benzenephosphinic Acid to Uranium in Simulated Leach Solution | pH of Simulated Leach Solution | Uranium Precipitated, Percent [1] | Uranium Remaining in Cake after Caustic Soda Treatment, Percent of Original [2] |
|---|---|---|---|
| 10:1 | 1.0 | 85 | 79 |
| 10:1 | 1.5 | 90 | 85 |
| 20:1 | 1.0 | 91 | 91 |
| 20:1 | 1.5 | 72 | 72 |

[1] Based on analysis of solution after precipitation of uranium.
[2] Based on the analysis of the final cake.

EXAMPLE IV

The extent to which ferric, ferrous or aluminum ions interfered with precipitation of uranium as uranyl ion by bis-benzenephosphinic acid was determined by adding ten times the stoichiometric requirement of said organic reagent to precipitate uranium from acidic aqueous solution containing 50 mg./liter uranium. From the data following it is apparent that neither ferrous nor aluminum ions definitely interfered. The data further show that neither ferrous ions nor aluminum (each present in equimolar amounts in the same solution) adversely affected precipitation.

TABLE VI

*Effect of extraneous ions on precipitation of uranium from sulfuric acid solutions by bis-benzenephosphinic acid [1]*

| Mole Ratio of Extraneous Ion to Uranium in Solution | Form in Which Precipitate was Added | pH of Solution | Uranium Precipitated, Percent | | | |
|---|---|---|---|---|---|---|
| | | | Interfering Ion Present | | | |
| | | | None | Fe+3 | Fe+2 | Al+3 |
| 0 | Free acid [2] | 0 | 92 | | | |
| 100:1 | do | 0 | | 30 | 87 | 85 |
| 200:1 | do | 0 | | 5 | 97 | 97 |
| 0 | do | 1 | 99 | | | |
| 100:1 | do | 1 | | 20 | 98 | 98 |
| 200:1 | do | 1 | | 15 | 91 | |
| 0 | Sodium salt [3] | 0 | 30 | | | |
| 100:1 | do | 0 | | 40 | 9 | 10 |
| 200:1 | do | 0 | | 5 | 40 | 5 |
| 0 | do | 1 | 98 | | | |
| 100:1 | do | 1 | | 8 | 98 | 98 |
| 200:1 | do | 1 | | 10 | 99 | 99 |

[1] Solutions contained 50 mg. of uranium (as uranyl ion) per liter; precipitant was added either as an alcoholic solution, in the case of the free acid, or as an aqueous solution, in the case of the sodium salt of the acid; amount of precipitant was 10 times the theoretical for the uranyl ion present, assuming two phosphinate ions per uranyl ion.
[2] The bis-benzenephosphinic acid was dissolved in aqueous alcohol before adding to the test solution.
[3] The bis-benzenephosphinic acid was added to the test solution in the form of its water-soluble sodium salt.

The extent to which precipitation of uranium from aqueous solutions is affected by extraneous metal ions is shown by the following data. A solution containing 150 mg./l. of uranium in dilute sulfuric acid having a pH of 1 has 99% of the uranium precipitated from said solution in the absence of either molybdenum or vanadium. However, in a similar solution containing an added 150 mg./l. molybdenum, uranium precipitation was reduced to 22%; in a similar solution, but for the presence of an added 150 mg./l. vanadium, 39% uranium was precipitated; and from a solution containing 150 mg. each of molybdenum, vanadium and uranium only 22% uranium was precipitated.

EXAMPLE V

The dibasic organic acids containing aryl groups and phosphorus values, which phosphonic acids are designated by the type formula, $ArPO_3H_2$, wherein Ar denotes a phenyl radical, are somewhat less effective than the corresponding monobasic phosphinic acids, as shown by the following data.

TABLE VII

*Precipitation of uranium from sulfuric acid solution with phosphonic acids [1]*

| Phosphonic Acid, $RPO_3H_2$ | Percent of Uranium Precipitated at pH of— | | | |
|---|---|---|---|---|
| | 0 | 1 | 2 | 3 |
| Benzenephosphonic acid | 0 | 0 | 0 | [2] 59 |
| p-Toluenephosphonic acid | 0 | 0 | 61 | 83 |
| p-Chlorobenzenephosphonic acid | 50 | 45 | 81 | 74 |
| p-Aminobenzenephosphonic acid | 0 | 0 | 33 | 84 |
| Heptanephosphonic acid | 0 | 0 | 0 | 0 |
| Cyclohexanephosphonic acid | 0 | 0 | 40 | 86 |
| Benzylphosphonic acid | 5 | 10 | 25 | 47 |
| bis-(p-aminobenzene)phosphinic acid [3] | 0 | 0 | 2 | 86 |

[1] Original solutions contained 50 mg. of uranium. Precipitation was carried out at room temperature by adding 0.5 gram of precipitant to the solution and stirring for 30 minutes.
[2] Solution was boiled to obtain a precipitate.
[3] This compound was a phosphinic acid with the structure $(p-NH_2-C_6H_4)_2PO_2H$.

Another embodiment of our invention is concerned with the discovery that organic acids containing an aryl group and arsenic are also effective precipitants for uranium from acidic aqueous solutions and are operative in either phosphoric or dilute sulfuric acid solutions. Both the monobasic arsinic acids, $R_2AsO_2H$, and the dibasic arsonic acids, $RAsO_3H_2$, precipitate uranium in substantially quantitative amounts from acidic aqueous solutions having a pH preferably between 1 and 3 and not more acidic than pH 1 nor more basic than the upper limit of pH 3. Phenoxarsinic acid, which has the structural formula

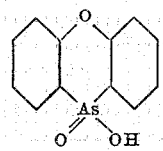

is the preferred arsenic-containing aryl organic acid and precipitates uranyl ions substantially quantitatively in the absence of iron values. As with the corresponding phosphorus-containing acids, it is essential that the arsinic acid-treated solution be substantially free of those iron values with a valence in excess of the bivalent. However, the arsenic-containing acids also effected selective separation of uranium from acidic aqueous solutions containing extraneous metal values normally associated with uranium, in particular metal values such as aluminum, iron, magnesium and molybdenum. The arsenoacid used to precipitate uranium in accordance with this invention is preferably employed in an amount five times the stoichiometric amount. Optimum results are obtained with solutions having a pH of 1 for precipitation with the monobasic arsinic acid, and a pH of between 2 and 3 for precipitation with the dibasic arsonic acid. Precipitation of uranium from sulfuric acid solutions at a pH of 2 and 3 is nearly quantitative with phenylarsonic acid, with phenoxarsinic acid, bis-phenylarsinic acid, bis(p-aminophenyl) arsinic acid, 3,5 diiodo-4-aminophenyl arsonic and allyl-, benzyl-, p-butyl, p-carboxyphenyl and p-nitrophenyl arsonic acids.

EXAMPLE VI

The efficiency of uranium precipitation from sulfuric acid solutions at a pH of 1 and in the presence of extraneous metal ions is shown by the data following wherein the preferred arsinic precipitant, namely, phenoxarsinic acid, was employed.

TABLE VIII

Removal of uranium from sulfuric acid solutions by phenoxarsinic acid [1] in the presence of extraneous ions [2] at pH 1

| Extraneous Ion | Mole Ratio of Extraneous Ion to Uranium | Uranium Precipitated, Percent |
|---|---|---|
| None added [3] | | 98 |
| $Fe^{+2}$ | 213:1 | 98.5 |
| $SO_4^{-2}$ | 213:1 | |
| $Fe^{+2}$ | 213:1 | 84.0 |
| $SO_4^{-2}$ | 872:1 | |
| $Fe^{+2}$ | 213:1 | |
| $Mg^{+2}$ | 115:1 | 90.5 |
| $PO_4^{-3}$ | 77:1 | |
| $SO_4^{-2}$ | 213:1 | |
| $Fe^{+2}$ | 213:1 | |
| $Al^{+3}$ | 440:1 | 85.0 |
| $SO_4^{-2}$ | 872:1 | |
| $Al^{+3}$ | 440:1 | 96.0 |
| $SO_4^{-2}$ | 660:1 | |
| $Al^{+3}$ | 440:1 | |
| $Mg^{+2}$ | 115:1 | 95.2 |
| $SO_4^{-2}$ | 660:1 | |
| $PO_4^{-3}$ | 77:1 | |
| $Mg^{+2}$ | 115:1 | 96.0 |
| $PO_4^{-3}$ | 77:1 | |
| $Mg^{+2}$ | 115:1 | |
| $PO_4^{-3}$ | 77:1 | 80.0 |
| $SO_4^{-2}$ | 872:1 | |
| $SO_4^{-2}$ | 872:1 | |
| $Na^{+1}$ | 1744:1 | 86.5 |
| $Fe^{+2}$ | 213:1 | |
| $Al^{+3}$ | 440:1 | |
| $Mg^{+2}$ | 115:1 | 66.6 |
| $PO_4^{-3}$ | 77:1 | |
| $SO_4^{-2}$ | 872:1 | |

See footnotes bottom of column 8.

For comparison with the arsinic acids, the arsonic acids listed below were each dissolved in 50 ml. of a 20% aqueous alcohol solution which was then added to 350 ml. of a sulfuric acid solution at the indicated pH containing 20 mg. of uranium as uranyl ion. Frequently 5 to 10 minutes' boiling was necessary to induce precipitation with the respective arsonic acids. In any case, the mixture was stirred 30 minutes prior to filtering.

TABLE IX

Precipitation of uranium with arsonic acids

| Arsonic Acids [1] $RAsO_3H_2$ | Uranium Precipitated, Percent [2] | | | |
|---|---|---|---|---|
| | pH of Solution | | | |
| | 0 | 1 | 2 | 3 |
| Allyl | 0 | 0 | 0 | 93 |
| Benzyl | 0 | 0 | 0 | 89 |
| n-Butyl | 0 | 0 | 0 | 94 |
| p-Carboxyphenyl | 0 | 0 | 0 | 85 |
| p-Dimethylaminoazophenyl | 11 | 5 | 20 | 13 |
| Ethyl | 0 | 0 | 0 | 0 |
| o-Nitrophenyl | 0 | 0 | 0 | 15 |
| m-Nitrophenyl | 0 | 0 | 0 | 78 |
| p-Nitrophenyl | 0 | 0 | 0 | 86 |
| α-Naphthyl | 0 | 0 | 33 | |
| Benzene | 0 | 0 | 0 | 92 |

[1] The amount of precipitant was ten times the theoretical for the uranyl ion present, assuming two arsonate ions per uranyl ion.
[2] Based on solution analysis.

Precipitation of uranium with aromatic arsonic acids was effected from buffered solutions at a low pH (2.0–2.4) and containing 10 mg. of uranium in 400 ml. solution. Five grams of each of the following reagents were used:

| Precipitating Agent | pH Solution | Uranium Precipitated, Percent |
|---|---|---|
| Arsonilic acid | 2.0 | 100 |
| p-Chloroarsonic acid | 2.4 | 90 |
| p-Tolylarsonic acid | 2.4 | 96 |

The foregoing disclosure and examples are merely illustrative of the processes of the instant invention, but the scope of the instant invention is not to be limited thereby but only by the scope of the claims appended hereto.

What is claimed is:

1. A process for recovery of uranium values from an acidic aqueous solution thereof which comprises precipitating said uranium with an organic acid of the group consisting of phosphinic and phosphonic acids containing an aryl group from said solution wherein the pH is between 0 and 3, separating the resultant uranium-containing precipitate from said acidic solution, hydrolyzing said precipitate with dilute alkali so as to form the insoluble alkali diuranate and the alkali salt of said organic acid, separating said diuranate from the aqueous soluble solution containing the sodium salt of the organic acid, collecting and recycling said aqueous solution of the sodium salt of said organic acid for precipitation of uranium values from a fresh charge of an aqueous solution containing additional uranium values dissolved therein.

[1] Phenoxarsinic acid has the structural formula:

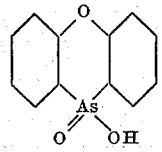

[2] Solutions contained 150 mg. of uranium per liter, and the ions indicated in the table. Precipitations were carried out using five times the theoretical quantity for the uranyl ion present, assuming two arsinate ions per uranyl ion.
[3] Except $H_2SO_4$ to adjust pH.

2. The process of claim 1 wherein the organic acid is bis-benzenephosphinic acid.

References Cited in the file of this patent

Ware: Organic Reagents for Uranium Analysis, U. S. Atomic Energy Commission declassified document MDDC 1432, page 8, declassified November 7, 1947. (Copy in Scientific Library.)

Mann: The Chemistry of Heterocyclic Compounds (The Heterocyclic Derivatives of Phosphorus, Arsenic, Antimony, Bismuth, and Silicon), pages 100–102 (1950). Interscience Publishers, Inc., New York. (Copy in Scientific Library.)